No. 837,376. PATENTED DEC. 4, 1906.
J. W. BARNES, Jr.
SPRING TIRE.
APPLICATION FILED NOV. 1, 1905.
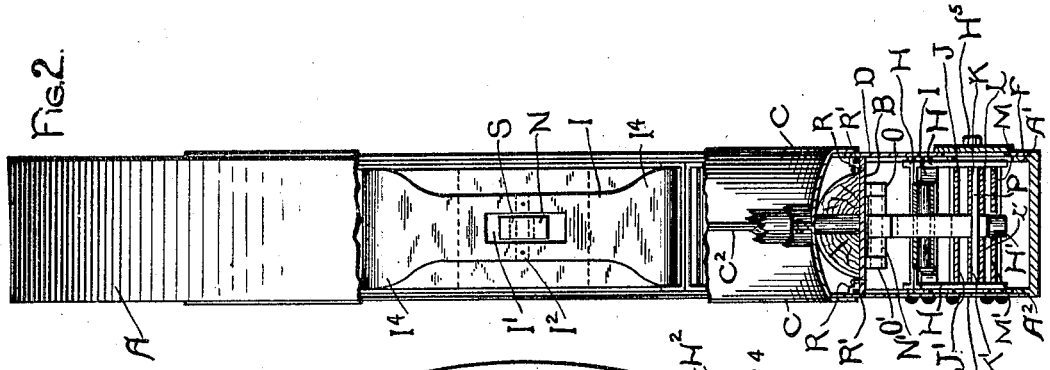
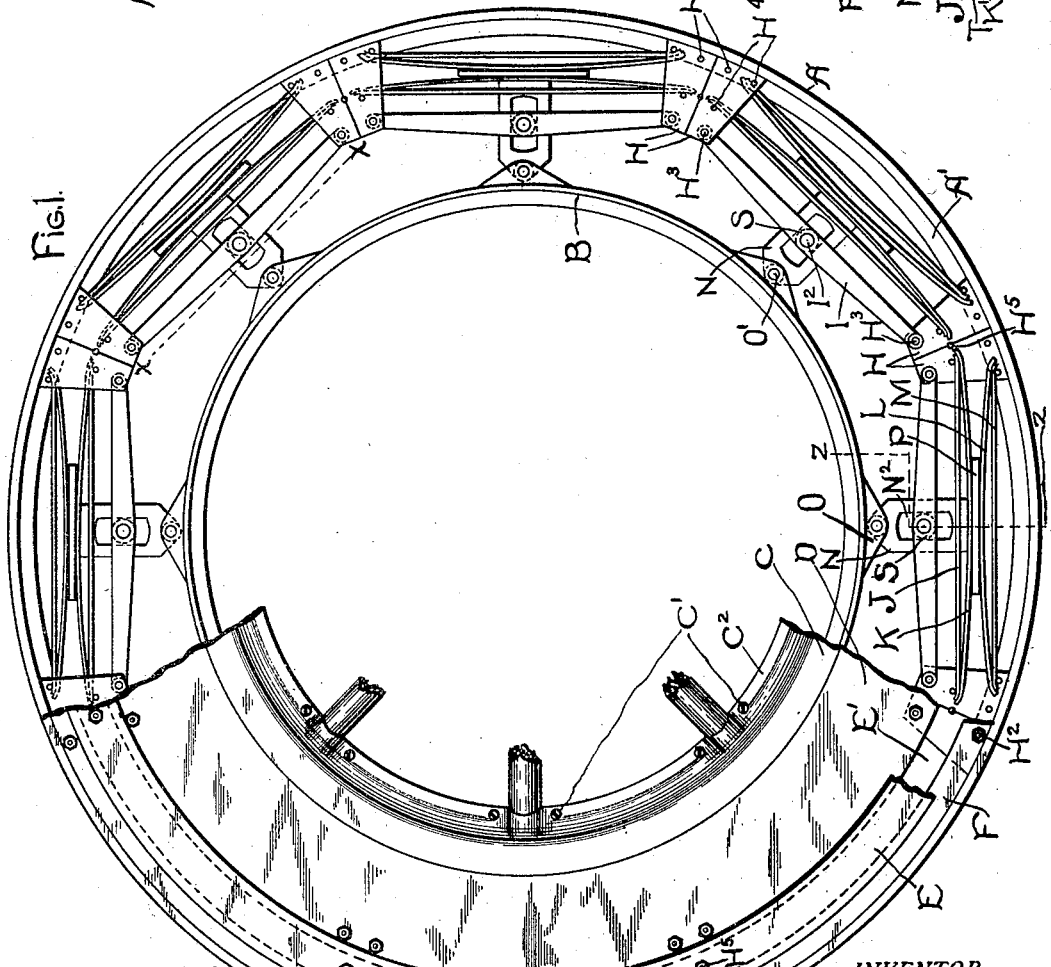
WITNESSES:
INVENTOR.
Justus W. Barnes, Jr.
BY
ATTORNEY.

UNITED STATES PATENT OFFICE.

JUSTUS W. BARNES, JR., OF PITTSFIELD, MASSACHUSETTS, ASSIGNOR OF ONE-HALF TO WILLIAM A. WHITTLESEY, OF PITTSFIELD, MASSACHUSETTS.

SPRING-TIRE.

No. 837,376.  Specification of Letters Patent.  Patented Dec. 4, 1906.

Application filed November 1, 1905. Serial No. 285,499.

*To all whom it may concern:*

Be it known that I, JUSTUS W. BARNES, Jr., a citizen of the United States, residing at Pittsfield, in the county of Berkshire and State of Massachusetts, have invented new and useful Improvements in Spring-Tires for Vehicle-Wheels, of which the following is a full and complete specification, such as will enable those skilled in the art to which it appertains to make and use the same.

This invention relates to spring-tires for vehicle-wheels, the principal object thereof being to provide an elastic, durable, and puncture-proof tire possessing all the advantages, with none of the disadvantages, of pneumatic tires and adaptable to the frame of ordinary vehicle-wheels.

With this and other objects in view my invention consists in certain features of construction and combination of parts, as hereinafter described and claimed, reference being had to the drawings forming a part of this specification, in which corresponding parts are designated by similar reference characters in each of the views.

In the construction of my invention I provide two circular metallic bands of unequal diameter arranged concentrically, with annular space intervening of sufficient width for the reception of springs and other mechanism, thereby forming an elastic connection between said bands. The smaller band is made of a size corresponding to the periphery of the felly of the wheel and adapted to be rigidly affixed thereon, while the larger band offers the wearing surface or tread. The sides and top of my tire, including the interior mechanism and felly of the wheel, are wholly enveloped in a metallic casing, which is designed to receive and retain a preferred form of lubricant to facilitate the operation of the mechanism and to prevent the admission of water, dust, or other extraneous substance.

Figure 1 is a side elevation of a wheel-tire made according to my invention, portions of the casings thereof being broken away to expose the interior mechanism; Fig. 2, a front elevation thereof, showing section of outer band or tread A, also a cross-section on line $zz$, Fig. 1, and a top view of a pivot-bar I on line $xx$, Fig. 1.

In the accompanying drawings, A and B represent two endless concentric bands, which may be designated as the "tread" and "felly" band, respectively. The tread-band may be flat, concave, or convex, with a smooth or uneven wearing-surface of any approved description. Said band A is provided upon its interior surface with two parallel annular flanges A' and A², Fig. 2, of uniform width, which may be an integral part of the band or rigidly attached thereto, forming an angular groove or channel with the extended edges of the band for the reception and attachment of the side casings F and T, Fig. 2. The interior surface of said band A is further provided with upright angular brackets H, Figs. 1 and 2, placed in pairs back to back at equal intervals around the band in the space intervening between said flanges A' and A² and attached thereto by means of bolts H², Fig. 1.

The brackets H are preferably constructed of thin sheet metal formed into the shape of a capital letter E, with quadrilateral end or side wings projected at right angles to the middle rib and a central wing or partition projected therefrom, the end of which is indicated by the character H' in Fig. 2, equally dividing the interspacing between said side wings and of uniform size therewith. The brackets H are traversed by horizontal bearing-pins H⁴, supporting the springs J J', K K', &c., and bolts H³ for support of pivot-bar I.

Traversing longitudinally each section of the tire are a plurality of flat springs J and J', K and K', L and L', M and M', preferably composing four sets arranged in pairs two pairs above and two below the spreader P and on either side of the rocker N. Said springs are slightly curved at their ends to prevent displacement from their respective positions on bearing-pins H⁴, while the inner springs K and K', L and L' are slightly more crowned than the others, being designed thus to receive and bear the normal load strain of the vehicle, while the outer springs are adapted to sustain all unusual strains and shocks or sudden and violent jolts upon the tire.

N, Fig. 1, represents a rocker provided centrally with an elongated slot N² and at its extremities with horizontal arms N' and spreader P, said rocker being attached to inner band B by means of parallel lugs or ears O, projecting from said band, and pin O', traversing the lugs O and rocker-arms N'. Said rocker N is pivoted centrally upon a friction-roller S, intercepting slot N² and imparting a rotatory motion to rocker N, said roller S being secured to horizontal pivot-bar I by means of a pin I², Figs. 1 and 2. Pivot-bar I is preferably constructed of molded sheet metal, having overlapping sides and expanded ends I⁴, forming terminal eyes for bearing-bolts H³, and a rectangular slot I', located centrally for the reception of rocker N, said slot I' containing a friction-roller S, mounted upon a stationary pin I², passing transversely through the pivot-bar I. The spreader P is preferably constructed of a flat rectangular metallic plate of a width equal to the space between the side wings of the brackets H and is rigidly secured to the rocker end in any approved manner, but preferably by means of the engagement of notches provided laterally in the neck of the rocker, with a slot of corresponding dimensions located centrally in said spreader.

T, Fig. 2, represents an annular side casing of uniform width constructed of flat sheet metal adapted to fit closely over one side of the tire for the reception of the interior mechanism and the exclusion of foreign substances, said casing being constructed to fit into the angular groove formed by the flange A² and the extended edge of band A and secured firmly in position by bolts H², passing transversely through the tire. Said casing T is made somewhat wider than the annular space between bands A and B, thus extending beyond the edge of band B and bearing movably against the same.

F E D form parts of the casing for the opposite side of the tire and are similarly constructed and adapted, except that an annular cap E, secured in position by bolts H⁵, is adapted to cover an annular opening E', provided in said casing for the purpose of facilitating a readjustment of the springs when necessary and for the introduction of a lubricant, with which the interior of the tire is filled for the protection and lubrication of the mechanism. It will be apparent that side casing T and part D of casing F E D, bearing movably against the extended edges of inner band B, serve to support band A in position and to prevent lateral motion thereof.

R represents endless angular water-tight caps secured by rivets to the inner surface of band B on either side thereof, bearing movably against the side casings T and D. Said caps are preferably constructed of thin molded sheet metal and are designed to hold in position inclosed annular washers R', of felt or other suitable material, bearing closely against the projected edges of said side casings T and D.

C represents a top casing or cap adapted to inclose the space between the extended edges of the side casings overlapping said edges and bearing laterally movably against the same, thereby excluding extraneous substances from the interior of the tire and coöperating with said side casings as a supporting-guide. Said casing C is preferably constructed of thin sheet metal forming two annular sections, secured together by screws or rivets C', passing through upturned edges C², said sections engaging with the spokes of the wheel and covering the felly thereof; but it will be apparent that while said top casing C is independently movable relatively to the side casings T and D E F sufficient space is allowed to intervene between the latter casings and the crown of casings C to admit of the free movement thereof without interference.

In operation the action of my tire is as follows: The load strain applied to the wheel causes the outer band A of the tire to become slightly eccentric to the axis of the wheel, while the resiliency of the springs tends to force the band to return to its normal position with reference to said axis. The rockers in the sections of the tire immediately above and beneath the axis of the wheel being the top and bottom sections, respectively, are actuated slightly earthward, causing their respective spreaders to bear upon the crown-springs directly beneath, while all other rockers in the remaining sections by the coöperative action of their respective pivots, tending in the direction of the line of force, cause their respective spreaders to bear upon the crown-springs on either side thereof, said last-mentioned springs being actuated by a gyratory movement of the spreaders. When extraordinary load strain is applied to the wheel or in event of a sudden violent shock or jolt overcoming the maximum resistance of the lighter crown-springs, the heavier outer springs are then subjected to the overstrain.

Having fully described my invention, I claim as new and desire to secure by Letters Patent—

1. A wheel-tire, comprising two concentric bands of unequal diameter having the annular space between said bands equally divided into independent sections, each of said sections containing spring mechanism receiving a proportionate part of the load strain upon the wheel; said mechanism comprising a plurality of flat springs in pairs actuated by interposed spreaders.

2. In tires for wheels, an inner band mounted upon the felly of the wheel, an outer band of larger diameter and concentric therewith, and interposed elastic connection supporting said outer band; said connection consisting of flat springs disposed in pairs circumferentially, tangentially to the inner band and actuated by interposed spreaders; the said springs and the said spreaders being secured to opposite bands.

3. In a wheel-tire, an inner band rigidly mounted upon the felly of the wheel, an independently-movable outer band concentric therewith, and interposed mechanism forming an elastic connection between said bands, in combination with waterproof covering incasing said bands and mechanism and cooperating therewith; said covering comprising rigid annular side plates attached to the outer band and projected beyond the edges of the inner band, bearing movably against the same and thereby forming a laterally-supporting guide for said outer band, and an annular felly-cap adapted to envelop the projecting edges of said side plates, bearing movably against the same.

4. In tires for wheels, the combination of an inner rim or band rigidly mounted upon the felly, an independently-movable outer rim concentric therewith, and interposed elastic connection between said bands consisting of flat springs in pairs attached to the outer rim and affected yieldingly by interposed plates or spreaders connected with the inner rim by means of pivotal rockers actuating said plates or spreaders.

5. A wheel-tire, consisting of two concentric bands of unequal diameter having the annular space between said bands equally divided into sections; each of said sections containing a plurality of springs with interposed plates or spreaders secured to pivotal rockers attached to the inner rim or band; said springs being actuated by a gyratory movement of the spreaders.

6. In tires for wheels, in combination, an inner band, B, mounted upon the felly of the wheel, a flanged outer band, A, having a wearing surface or tread, of larger diameter and concentric with said inner band, B, sectional mechanism interposed between said bands, forming an elastic connection thereof, composed of slotted rockers, N, attached at one end to the periphery of the inner band, B, by a pivotal joint formed by parallel lugs, O, by intercepting rocker-arms, N', and transverse pin, O', friction-rollers, S, supported upon pivot-bar, I, and intercepting the slot, N², of the rockers, pivot-bars, I, supported at either end by brackets H, a plurality of springs, J and J', K and K', L and L', M and M', supported by brackets, H, plates or spreaders, P, attached at one end of rockers, N, and intercepting said springs actuated yieldingly thereby, brackets, H, secured to outer band, A, by means of annular flanges, A' and A², side walls or casings, T and F, E, D, attached to said outer band, A, and projected beyond edges of inner band, B, and bearing movably against the same, thereby forming a laterally-supporting guide for movements of band A, and a coöperative top or felly casing, C, supporting laterally said side casings and forming a water and dust proof cap over same, substantially as shown and described.

In testimony that I claim the foregoing as my invention I have hereunto signed my name, in the presence of the subscribing witnesses, this 30th day of October, A. D. 1905.

JUSTUS W. BARNES, JR.

Witnesses:
JNO. J. WHITTLESEY,
ANNIE E. COWLIN.